Patented June 6, 1939

2,161,627

UNITED STATES PATENT OFFICE

2,161,627

AZO DYESTUFFS

Arthur Howard Knight, Blackley, Manchester, England, assignor to Imperial Chemical Industries Limited, a corporation of Great Britain No Drawing. Application March 18, 1938, Serial No. 196,793. In Great Britain March 23, 1937

3 Claims. (Cl. 260—155)

The present invention relates to the manufacture of water-soluble monoazo dyestuffs and to their use for colouring acetate artificial silk.

This invention has as an object to devise a method of manufacturing new water-soluble monoazo dyestuffs. A further object is to provide new water-soluble monoazo dyestuffs. A still further object is to devise a new method of colouring acetate artificial silk. A still further object is to provide acetate artificial silk in new colours. Further objects will appear hereinafter. These objects are accomplished by the following invention.

I have found that I can manufacture new dyestuffs by coupling a diazotised para-nitroamine of the benzene or naphthalene series, devoid of sulphonic and carboxylic acid groups, with the sulphuric ester of a substituted Py-tetrahydro-3-hydroxyquinoline of the general formula

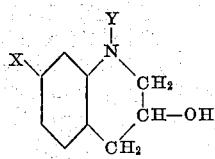

where X represents hydrogen, halogen or alkyl and Y represents alkyl or aralkyl.

Alternatively, I can manufacture the said new dyestuffs by treating the water-insoluble dyestuffs obtained by coupling a diazotised para-nitroamine of the benzene or naphthalene series, devoid of sulphonic and carboxylic acid groups, with a substituted Py-tetrahydro-3-hydroxyquinoline of the general formula

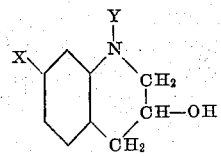

where X and Y have the same significance as before, with an agent adapted to form their sulphuric esters, such as, for example, sulphuric acid.

Also according to the invention I can apply the new dyestuffs to the colouring of acetate artificial silk.

The coupling components employed according to the embodiment of the invention first specified above may be prepared by treating the appropriate Py-tetrahydro-3-hydroxyquinoline derivatives, as above defined, with an agent adapted to form their sulphuric esters such as, for example, chlorosulphonic acid or sulphuric acid.

The invention is illustrated, but not limited, by the following examples in which the parts are by weight.

Example 1

13.8 parts of p-nitroaniline are diazotised in the known manner and the diazo solution so obtained is added to a cooled aqueous solution of 27.2 parts of the sulphuric ester of 1-ethyl-3-hydroxy-7-methyl-Py-tetrahydroquinoline containing sodium carbonate in sufficient amount to ensure that the solution remains alkaline to litmus after the addition of the diazo solution is complete. 10% of common salt (weight for volume) is then added to precipitate the dyestuff, which is filtered off and dried. It is soluble in warm water and produces on acetate artificial silk crimson-red shades when applied from a neutral dyebath containing 1% common salt. It has the probable formula

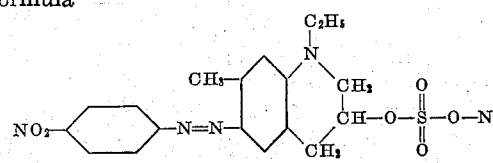

Example 2

19 parts of 2:4-dinitroaniline are added to a solution of nitrosyl sulphuric acid, obtained by adding 6.9 parts of dried sodium nitrite to 140 parts of concentrated sulphuric acid, and the liquid is stirred until the amine is dissolved. The resulting solution is poured upon ice and the aqueous solution so obtained is filtered. The filtered diazo solution is then added with stirring to an aqueous solution of 29.4 parts of the sodium salt of the sulphuric ester of 1-ethyl-3-hydroxy-7-methyl-Py-tetrahydroquinoline. If desired, a buffering agent, such as sodium acetate, is added to facilitate coupling. When coupling is complete the dyestuff is filtered off and washed with water to remove sulphuric acid. The dyestuff paste is suspended in 600 parts of water, and converted to its sodium salt by adding sodium carbonate until the solution is alkaline to litmus. Common salt is added, if necessary, to precipitate the new dyestuff, which is now in the form of its sodium salt, and the dyestuff is filtered off and dried. It is soluble in water and dyes acetate artificial silk in bluish-violet shades when applied from a neutral dyebath containing 1% salt. It has the probable formula

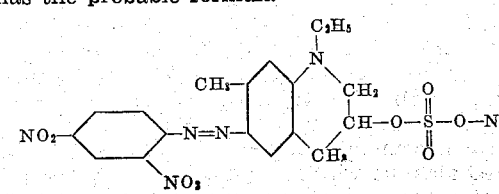

Example 3

13.8 parts of p-nitroaniline are diazotised and the diazo solution is added to a cooled aqueous solution of 25.8 parts of the sulphuric ester of 1-ethyl-3-hydroxy-Py-tetrahydroquinoline containing excess of sodium carbonate. The new dyestuff so obtained is isolated by the addition of 5% common salt (weight for volume), filtering and drying. It dissolves in hot water and yields red shades on acetate artificial silk when applied from a neutral dyebath containing 1% common salt. It has the probable formula

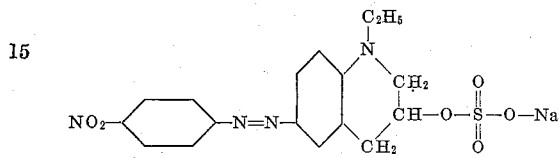

Example 4

13.8 parts of p-nitroaniline are diazotised in the known way and the diazo solution so obtained is added to a cooled solution of 31.8 parts of the sulphuric ester of 1-benzyl-3-hydroxy-Py-tetrahydroquinoline containing excess of sodium carbonate. The resulting new dyestuff is filtered off and dried. It dyes acetate artificial silk in red shades from a neutral dyebath containing 1% common salt. It has the probable formula

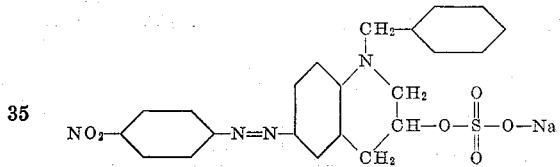

Example 5

18.3 parts of 2:4-dinitroaniline are diazotised by the aid of nitrosyl sulphuric acid in concentrated sulphuric acid solution in the known way and the aqueous solution of the diazo compound obtained by pouring the concentrated sulphuric acid solution on to ice is coupled with 21.9 parts of 1-n-butyl-3-hydroxy-7-methyl-Py-tetrahydroquinoline dissolved in dilute aqueous hydrochloric acid. The resulting insoluble monoazo compound after being filtered off and washed with water is re-suspended in water, the suspension rendered alkaline and the monoazo compound filtered off, dried and powdered. The powdered insoluble monoazo compound is then added slowly during about one hour to 150 parts of concentrated sulphuric acid. The sulphuric acid solution so obtained is stirred for a further 4-5 hours and then poured on to ice. The new sulphuric ester dyestuff, which is precipitated, is filtered off, re-suspended in 500 parts of water containing 50 parts of common salt and the suspension rendered alkaline with sodium carbonate. The new dyestuff (as sodium salt) is then filtered off and dried. It dissolves in warm water and dyes acetate artificial silk in bluish-violet shades when applied from a dyebath containing 1% common salt. It has the probable formula

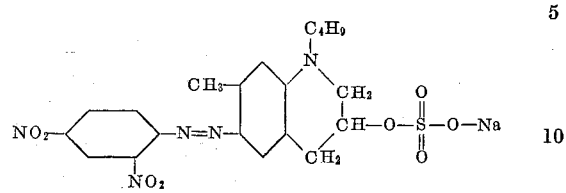

Example 6

21.75 parts of 6-chloro-2:4-dinitroaniline are gradually added to a solution of 6.9 parts of sodium nitrite in 150 parts of concentrated sulphuric acid. The resulting solution is warmed to 50-55° C., which temperature is maintained for two hours. The solution is then cooled to 20-25° C. and added slowly to a solution of 32.1 parts of the sodium salt of the sulphuric ester of 1-n-butyl-3-hydroxy-7-methyl-Py-tetrahydroquinoline and 13.6 parts of crystallised sodium acetate in 500 parts of water containing ice. Simultaneously 40% sodium hydroxide solution is added at such a rate that the coupling medium remains only faintly acid to Congo Red paper. During the coupling ice is added as necessary so that the temperature does not rise above 0° C.

When coupling is complete the suspension of the new dyestuff so obtained is rendered alkaline with caustic soda, the mixture stirred for some time to complete the conversion of the dyestuff to its sodium salt, and the latter filtered off and dried. It dyes acetate artificial silk in navy blue shades when applied from a dyebath containing 1% salt. It has the following probable formula

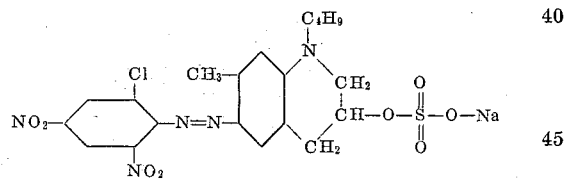

The invention is further illustrated by the dyestuffs of the following table:

| Example No. | Diazo component | Coupling component | Shade on acetate artificial silk |
|---|---|---|---|
| 7 | 2-chloro-4-nitroaniline | 1-ethyl-3-hydroxy-Py-tetrahydro-quinoline sulphuric ester | Very bluish red. |
| 8 | 2-cyano-4-nitroaniline | 1-ethyl-3-hydroxy-Py-tetrahydro-quinoline sulphuric ester | Reddish violet. |
| 9 | 2:4-dinitro-aniline | do | Bluish violet. |
| 10 | 2:6-dichloro-4-nitroaniline | do | Orange brown. |
| 11 | 4-nitro-1-naphthylamine | do | Bluish red. |
| 12 | 2:4-dinitro-aniline | 1-n-butyl-3-hydroxy-7-methyl-Py-tetrahydroquinoline sulphuric ester | Bluish violet. |
| 13 | 2-chloro-4-nitroaniline | do | Reddish violet. |
| 14 | 2-cyano-4-nitroaniline | do | Bluish violet. |
| 15 | 2:4-dinitro-aniline | 1-n-butyl-3-hydroxy-7-chloro-Py-tetra-hydroquinoline sulphuric ester | Reddish violet. |

This invention is a valuable advance in the art, giving new water soluble dyes which possess good affinity for acetate artificial silk which they dye in red, brown, violet and blue shades. They are also eminently suitable for the printing of acetate artificial silk.

As many apparently widely different embodiments of this invention may be made without departing from the spirit and scope thereof, it is to be understood that I do not limit myself to the specific embodiments thereof, except as defined in the appended claims.

I claim:
1. The sulfuric ester of the compound

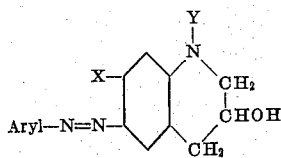

in which aryl is a radical from the group consisting of para-nitro-amines of the benzene and naphthalene series free from water-solubilizing groups, X is one of the group consisting of hydrogen, halogen, and alkyl, and Y is one of the group consisting of alkyl and aralkyl.

2. The compound represented by the formula:

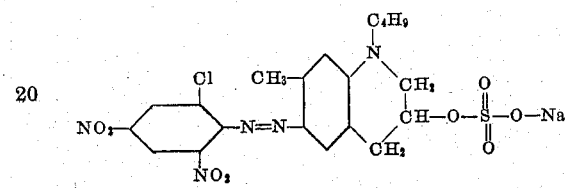

3. The process which comprises diazotizing one of the groups consisting of the para-nitro-amines of the benzene and naphthalene series devoid of sulfonic and carboxylic acid groups, and coupling it with the sulfuric ester of a Py-tetrahydro-3-hydroxy-quinoline of the formula:

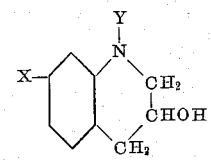

where X represents one of the group consisting of hydrogen, halogen or alkyl, and Y represents one of the group consisting of alkyl or aralkyl.

ARTHUR HOWARD KNIGHT.